US008036766B2

(12) United States Patent
Lindahl et al.

(10) Patent No.: US 8,036,766 B2
(45) Date of Patent: Oct. 11, 2011

(54) INTELLIGENT AUDIO MIXING AMONG MEDIA PLAYBACK AND AT LEAST ONE OTHER NON-PLAYBACK APPLICATION

(75) Inventors: Aram Lindahl, Menlo Park, CA (US); Joseph Mark Williams, Dallas, TX (US); Frank Zening Li, Hamilton (CA)

(73) Assignee: Apple Inc., Cupertino, CA (US)

( * ) Notice: Subject to any disclaimer, the term of this patent is extended or adjusted under 35 U.S.C. 154(b) by 1213 days.

(21) Appl. No.: 11/530,768

(22) Filed: Sep. 11, 2006

(65) Prior Publication Data

US 2008/0075296 A1 Mar. 27, 2008

(51) Int. Cl.
*G06F 17/00* (2006.01)
*A63F 13/00* (2006.01)

(52) U.S. Cl. .......... 700/94; 463/35

(58) Field of Classification Search .......... 700/94; 463/35

See application file for complete search history.

(56) References Cited

U.S. PATENT DOCUMENTS

| | | | | |
|---|---|---|---|---|
| 7,046,230 | B2 | 5/2006 | Zadesky et al. | |
| 7,069,044 | B2 | 6/2006 | Okada et al. | |
| 2002/0172395 | A1* | 11/2002 | Foote et al. | 382/100 |
| 2002/0189426 | A1 | 12/2002 | Hirade et al. | |
| 2003/0182001 | A1* | 9/2003 | Radenkovic et al. | 700/94 |
| 2003/0229490 | A1 | 12/2003 | Etter | |
| 2004/0069122 | A1 | 4/2004 | Wilson | |
| 2004/0094018 | A1 | 5/2004 | Ueshima et al. | |
| 2004/0198436 | A1 | 10/2004 | Alden | |
| 2005/0015254 | A1 | 1/2005 | Beaman | |
| 2005/0110768 | A1 | 5/2005 | Marriott et al. | |
| 2005/0182608 | A1* | 8/2005 | Jahnke | 703/6 |
| 2006/0221788 | A1 | 10/2006 | Lindahl et al. | |
| 2007/0068367 | A1* | 3/2007 | Schmidt et al. | 84/600 |

OTHER PUBLICATIONS

U.S. Appl. No. 11/481,303, filed Jul. 3, 2006.
U.S. Appl. No. 11/530,767, filed Sep. 11, 2006.
U.S. Appl. No. 11/530,773, filed Sep. 11, 2006.

* cited by examiner

*Primary Examiner* — Davetta Goins
*Assistant Examiner* — Joseph Saunders, Jr.
(74) *Attorney, Agent, or Firm* — Beyer Law Group LLP

(57) ABSTRACT

In operation of an electronics device, audio based on asynchronous events, such as game playing, is intelligently combined with audio output nominally generated in a predictive manner, such as resulting from media playback. For example, an overall audio output signal for the electronic device may be generated such that, for at least one of audio channels corresponding to predictive manner processing, the generated audio output for that channel included into the overall audio output signal is based at least in part on configuration information associated with a processed audio output signal for at least one of the audio channels corresponding to asynchronous events based processing. Thus, for example, the game audio processing may control how audio effects from the game are combined with audio effects from media playback.

31 Claims, 4 Drawing Sheets

INTELLIGENT AUDIO MIXING AMONG MEDIA PLAYBACK AND AT LEAST ONE OTHER NON-PLAYBACK APPLICATION

BACKGROUND

Portable electronic devices for media playback have been popular and are becoming ever more popular. For example, a very popular portable media player is the line of iPod® media players from Apple Computer, Inc. of Cupertino, Calif. In addition to media playback, the iPod® media players also provide game playing capabilities.

SUMMARY

The inventors have realized that it is desirable to create an integrated media playback and game playing experience.

A method to operate an electronics device includes intelligently combining audio based on asynchronous events, such as game playing, with audio output nominally generated in a predictive manner, such as resulting from media playback. For example, an overall audio output signal for the electronic device may be generated such that, for at least one of audio channels corresponding to predictive manner processing, the generated audio output for that channel included into the overall audio output signal is based at least in part on configuration information associated with a processed audio output signal for at least one of the audio channels corresponding to asynchronous events based processing. Thus, for example, the game audio processing may control how audio effects from the game are combined with audio effects from media playback.

DETAILED DESCRIPTION

In accordance with an aspect, a method is provided to operate an electronics device so as to intelligently combine audio based on asynchronous events, such as game playing, with audio output nominally generated in a predictive manner, such as resulting from media playback. For example, an overall audio output signal for the electronic device may be generated such that, for at least one of audio channels corresponding to predictive manner processing, the generated audio output for that channel included into the overall audio output signal is based at least in part on configuration information associated with a processed audio output signal for at least one of the audio channels corresponding to asynchronous events based processing. Thus, for example, the game audio processing may control how audio effects from the game are combined with audio effects from media playback.

Figure 1:
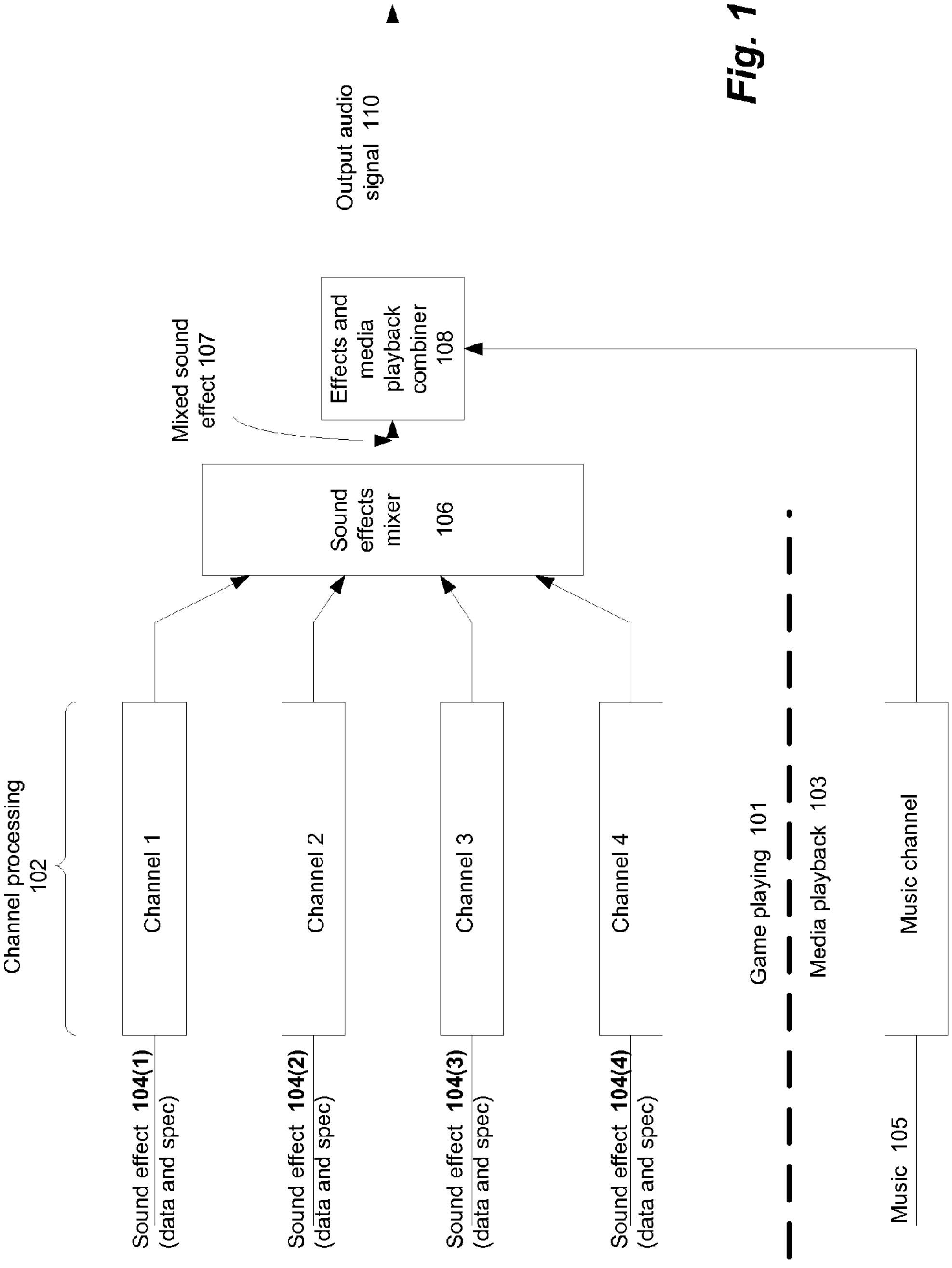
FIG. 1 is an architecture diagram broadly illustrating an example of processing to operate an electronics device so as to intelligently combine audio based on asynchronous events, such as game playing, with audio output nominally generated in a predictive manner, such as resulting from media playback.

FIG. 1 is an architecture diagram broadly illustrating an example of this processing. As shown in FIG. 1, game playing processing 101 and media playback processing 103 are occurring, at least when considered at a macroscopic level, in parallel. For example, the media playback processing 103 may include playback of songs, such as is a commonly-known function of an iPod media player. In general, the media playback nominally occurs in a predictive manner and, while user interaction may affect the media playback audio (e.g., by a user activating a "fast forward" or other user interface item), the media playback nominally occurs in a predictive manner.

The game playing processing 101 may include processing of a game, typically including both video and audio output, in response to user input via user interface functionality of the portable media player. Meanwhile the game application 116 may operate to, among other things, provide game video to a display 112 of the portable media player 110. The game application 116 is an example of non-media-playback processing. That is, the game video provided to the display 112 of the portable media player 110 is substantially responsive to game-playing actions of a user of the portable media player 110. In this respect, the game video is not nominally generated in a predictive manner, as is the case with media playback processing.

Sound effects of the game playing processing 101 may be defined by a combination of "data" and "specification" portions, such as is denoted by reference numerals 104(1) to 104(4) in FIG. 1. The "data" portion may be, for example, a pointer to a buffer or audio data, typically uncompressed data representing information of an audio signal. The specification may include information that characterizes the source audio data, such as the data format and amount. In one example, the sound effect data is processed to match the audio format for media playback.

The specification may further include desired output parameters for the sound effect, such as volume, pitch and left/right pan. In some examples, the desired output parameters may be modified manually (i.e., by a user via a user interface) or programmatically.

Furthermore, in some examples, a sound effect may be specified according to a loop parameter, which may specify a number of times to repeat the sound effect. For example, a loop parameter may specify one, N times, or forever.

In addition, a sound effect definition may be chained to one or more other sound effects definitions, with a specified pause between sound effects. A sequence of sound effects may be pre-constructed and substantially without application intervention after configuration. For example, one useful application of chained sound effects is to build phrases of speech.

Turning again to FIG. 1, each sound effect undergoes channel processing 102, according to the specified desired output parameters for that sound effect, in a separate channel. In FIG. 1, the sound effect 104(1) undergoes processing in channel 1, and so on. The number of available channels may be configured at run-time. A sound effects mixer 106 takes the processed data of each channel and generates a mixed sound effect signal 107. A combiner 108 combines the mixed sound effect signal 107 with the output of the music channel, generated as a result of processing a music signal 105 as part of normal media playback processing. The output of the combiner 108 is an output audio signal 110 that is a result of processing the sound effects definitions 104, as a result of game playing processing 101, and of processing the music signal 105, as part of normal media playback processing.

By combining game playing and media playback experiences, the user experience is synergistically increased.

Figure 2:
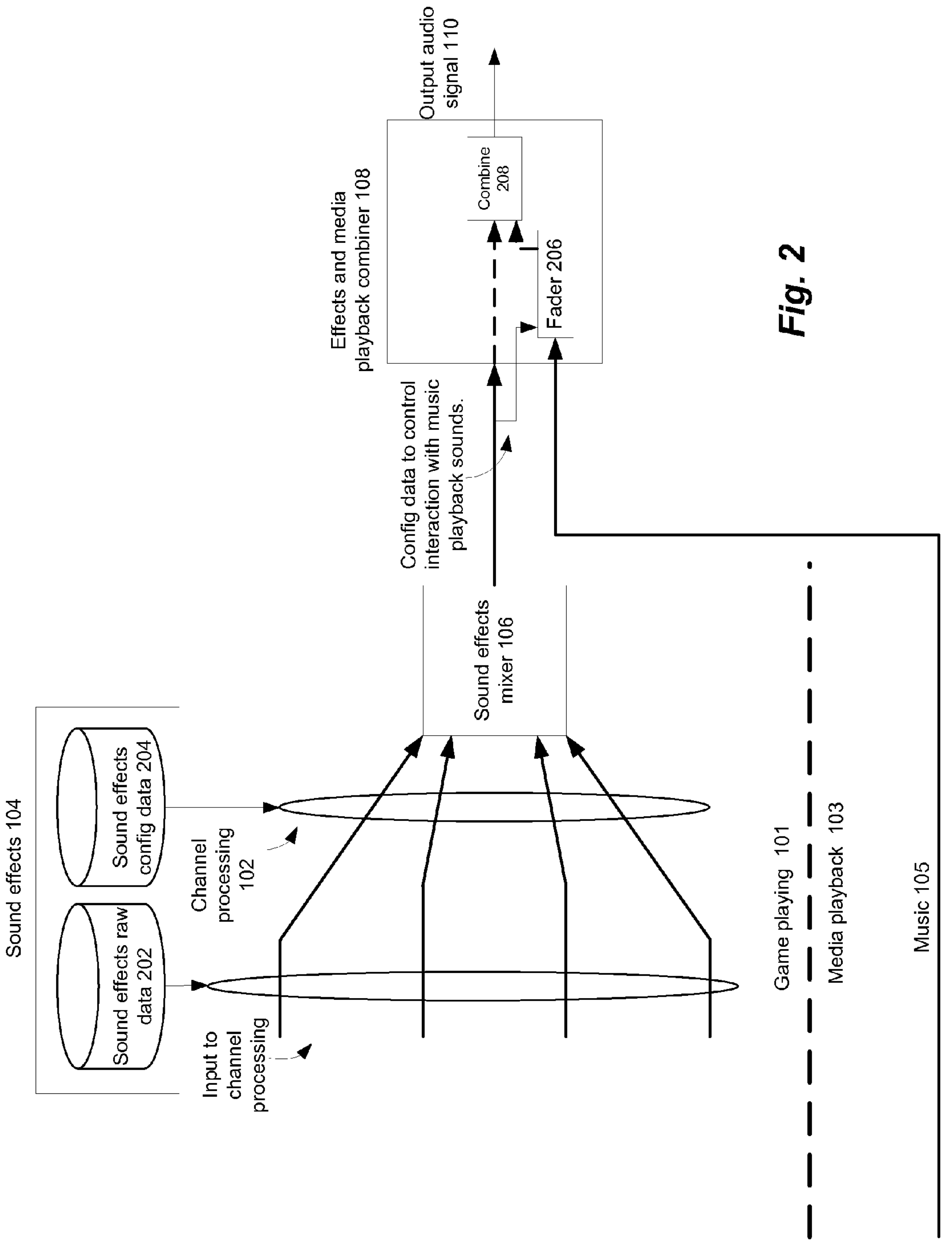
FIG. 2 is an architecture diagram similar to FIG. 1, but the FIG. 2 diagram shows some greater detail of how the game audio processing may control how audio effects from the game are combined with audio effects from media playback.

FIG. 2 is similar to FIG. 1 (with like reference numerals indicating like structure), but FIG. 2 shows some greater detail. In FIG. 2, the sound effects 104 are shown as including indications of sound effects raw data 202 and indications of sound effects configuration data 204. Furthermore, as also illustrated in FIG. 2, a portion of the output of the sound effect mixer 106 is shown as being provided to a fader 206. In this example, then, the game audio processing may control how audio effects from the game are combined with audio effects from media playback, by a fader 206 causing the music signal to be faded as "commanded" by a portion of the output of the sound effect mixer 106. The thus-faded music signal combine by a combine block 208 with the output of the sound effects mixer 106 to generate the output audio signal 110.

Figure 3:
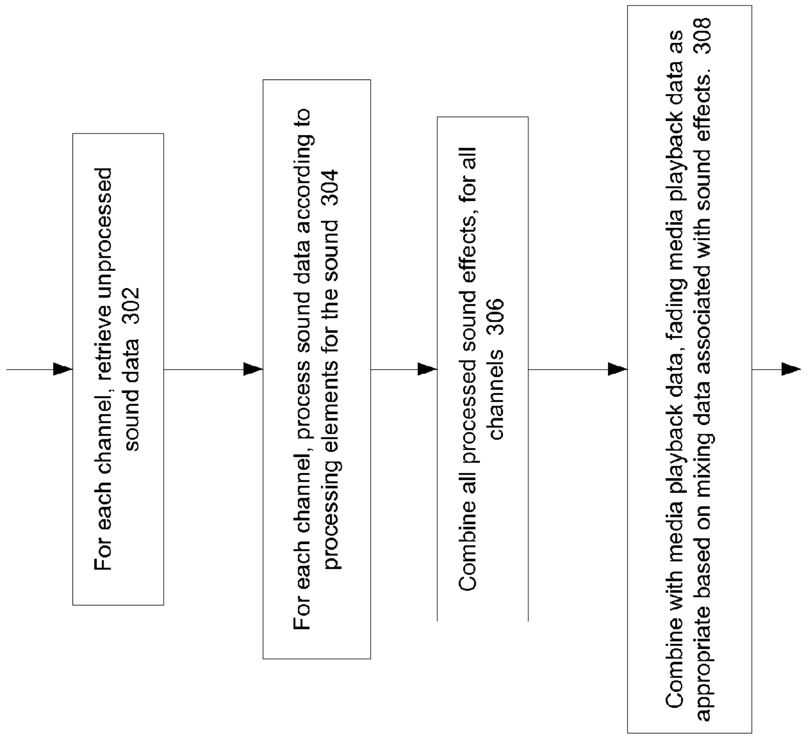
FIG. 3 is a flowchart providing an overview of the processing described with reference to the FIGS. 1 and 2 architecture diagrams.

FIG. 3 is a flowchart providing an overview of the processing described with reference to the FIGS. 1 and 2 architecture diagrams. At step 302, for each channel, unprocessed sound data is retrieved. At step 304, the sound data for each channel is processed according to processing elements for the sound. While the FIGS. 1 and 2 architecture diagrams did not go into this level of detail, in some examples, separate processing elements are used in each channel (the channel processing 102) to, for example, perform digital rights management (DRM), decode the input signal, perform time scale modification (TSM), sample rate conversion (SRC), equalization (EQ) and effects processing (FX).

At step 306, the processed sound effects for all channels are combined. At step 308, the combined sound effects signal and media playback signal are combined, with the media playback signal being faded as appropriate based on mixing data associated with the sound effects.

Figure 4:
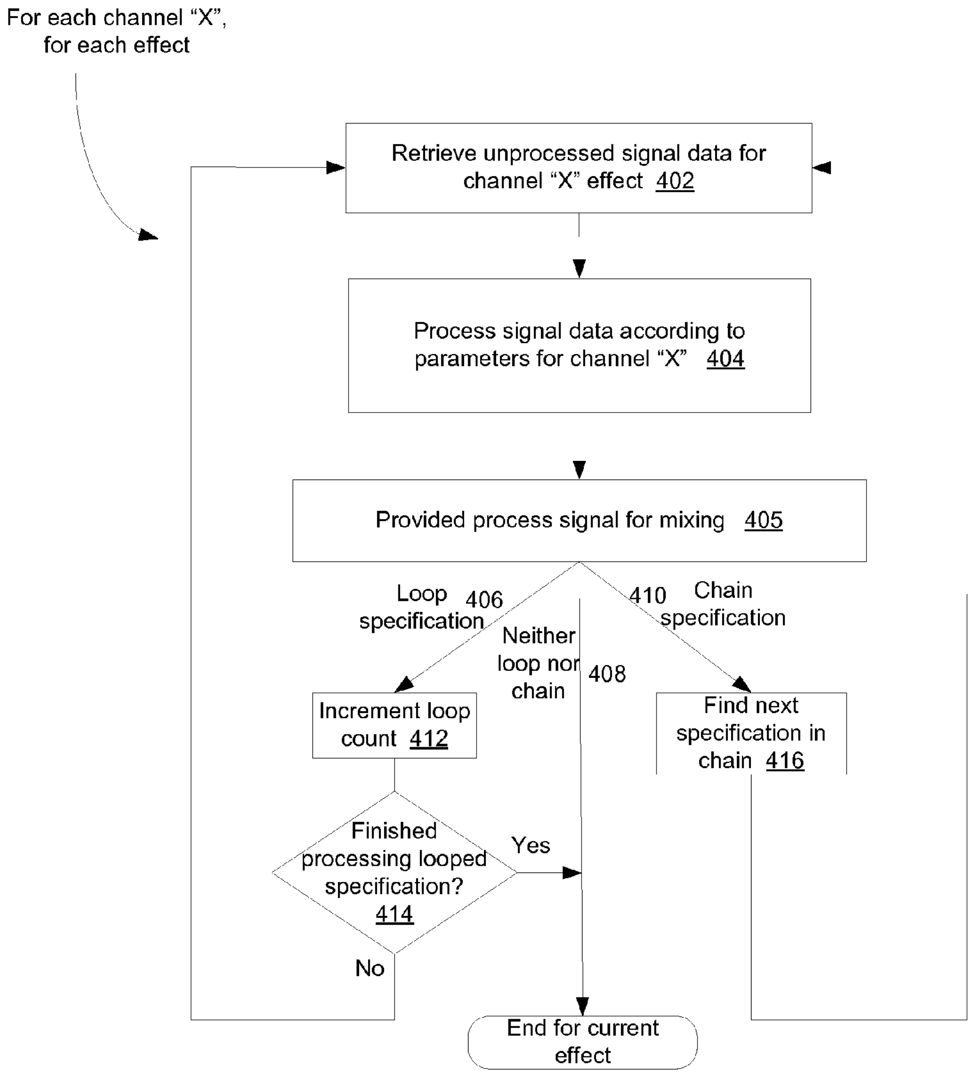
FIG. 4 is a flowchart that illustrates more detail on processing, within an arbitrary channel "X," of loop and chain specifications of the sound effects.

FIG. 4 is another flowchart, and the FIG. 4 flowchart provides more detail on processing, within an arbitrary channel "X," of loop and chain specifications of the sound effects. As mentioned above, a loop parameter may specify a number of times to repeat a sound effect and, also, a sound effect definition may be chained to one or more other sound effects definitions, with a specified pause between sound effects. At step 402, the unprocessed signal data for the channel "X" is retrieved. At step 404, the signal data is processed according to parameters for the channel "X" effect. At step 405, the processed sound effect signal is provided for combining with other processed sound effect signals.

Reference numerals 406, 408 and 410 indicate different processing paths. Path 406 is taken when a sound effect has an associated loop specification. At step 412, the loop count is incremented. At step 414, it is determined if the looped specification processing is finished. If so, then processing for the sound effect ends. Otherwise, processing returns to step 405.

Path 410 is taken when the sound effect has an associated chain specification. At step 416, the next specification in the chain is found, and then processing returns to step 402 to begin processing for the signal data of the next specification.

Path 408 is taken when the sound effect has neither an associated loop specification or an associated chain specification, and processing for the sound effect ends.

In some examples, it is determined to cause not include in the output audio signal 110 audio corresponding to one or more sound effects, even though the audio corresponding those one or more sound effects would nominally be included in the output audio signal 110. For example, this may occur when there are more sound effect descriptors than can be played (or desirably played) simultaneously, based on processing or other capabilities. Channels are fixed, small resources—they may be considered to be available slots that are always present. The number of sound effect descriptors that can be created is not limited by the number of available channels. However, for a sound effect to be included in the output audio signal, that sound effect is attached to a channel. The number of channels can change at runtime but, typically, at least the maximum number of available channels is predetermined (e.g., at compile time).

The determination of which sounds effects to omit may be based on priorities. As another example, a least recently used (LRU) determination may be applied. In this way, for example, the sound effect started the longest ago is the first sound effect omitted based on a request for a new sound effect.

In accordance with one example, then, the following processing may be applied.

N sound effects are included in the output audio signal 110 (where N is 0 to max sounds allowed)

A new sound effect is requested to be included in the output audio signal 110. To be included in the output audio signal 110, the sound effect is to be associated with a channel. There are two cases.

i. If N equals the maximum number of sounds allowed to be included in the output audio signal 110, then the sound effect started the longest ago is caused to be omitted, and processing of the newly-requested sound effect is started on the same channel.

ii. Otherwise, if N<the maximum number of sounds allowed to be included in the output audio signal 110, then the newly-requested sound effect is processed on the next available channel In one example, the sound effects mixer inquires of each channel 102 whether that channel is active. For example, this inquiry may occur at regular intervals. If a channel is determined to be not active (e.g., for some number of consecutive inquiries, the channel report being not active), then the channel may be made available to a newly-requested sound effect.

We have described how game audio processing may control how audio effects from non-media-playback processing (such as, for example, a game) are combined with audio effects from media playback, such that, for example, an audio experience pleasurable to the user may be provided.

The following applications are incorporated herein by reference in their entirety: U.S. patent application Ser. No. 11/530,807, filed concurrently herewith, entitled "TECHNIQUES FOR INTERACTIVE INPUT TO PORTABLE ELECTRONIC DEVICES," (Atty Docket No. APL1P486/P4322US1); U.S. patent application Ser. No. 11/530,846, filed concurrently herewith, entitled "ALLOWING MEDIA AND GAMING ENVIRONMENTS TO EFFECTIVELY INTERACT AND/OR AFFECT EACH OTHER,"; and U.S. patent application Ser. No. 11/144,541, filed Jun. 3, 2005, entitled "TECHNIQUES FOR PRESENTING SOUND EFFECTS ON A PORTABLE MEDIA PLAYER,".

What is claimed is:

1. A method for intelligently combining audio effects generated in accordance with a game process with audio from a media player on a portable computing device, the method comprising:

receiving audio from the media player;

receiving a plurality of sound effects from the game process, wherein the sound effects are generated in response to game-playing actions of a user of the portable computing device;

for each of the plurality of sound effects, receiving sound effect configuration information indicating chain or loop specifications for the corresponding sound effect;

determining if there are enough active audio channels to play the plurality of sound effects and the audio from the media player simultaneously;

modifying the audio from the media player at least in part in accordance with the sound effect configuration information; and when there are not enough active audio channels to play the plurality of sound effects and the audio from the media player simultaneously, mixing selected ones of the plurality of sound effects with the modified audio from the media player based on pre-established priorities and based on the sound effect configuration information.

2. The method of claim 1, wherein the pre-established priorities include a least recently used (LRU) standard.

3. The method of claim 1, further comprising polling each channel at regular intervals to determine which channels are active.

4. The method of claim 1, wherein the sound effect configuration information includes a definition of a corresponding sound effect.

5. The method of claim 1, wherein the mixing includes modifying the volume of the audio to a lower volume than it was originally output while still permitting a user of the portable computing device to hear the audio.

6. A portable media device comprising:

a game process arranged to generate sound effects when the game process is operating;

a media player configured to play music with or without the game process operating; and an effects and media playback combiner configured to output media from the media player to an output device without modification when the game process is not operating, and to receive the sound effects generated by the game process and mix the sound effects received from the game process with the media from the media player when the game process is operating, wherein the mixing includes examining sound effect configuration information received from the game process, wherein the sound effect configuration information include chain or loop specifications and format and amount of the sound effects, and wherein the sound effect configuration information is used to modify the media from the portable media player before the media is mixed with the sound effects generated by the game process.

7. The portable media device of claim 6, wherein the effects and media playback combiner is further configured to determine if there are enough active channels to play the sound effects with the media simultaneously by periodically polling each channel of the output device, and when there are not enough active channels to play the sound effects and the media simultaneously, selecting particular sound effects to mix with the media based on pre-established priorities.

8. The portable media device of claim 6, wherein the mixing includes fading the media.

9. The portable media device of claim 6, wherein the mixing includes modifying the pitch of the media.

10. The portable media device of claim 6, wherein the mixing includes modifying the volume of the media.

11. An effects and media playback combiner comprising:

means for receiving media from the media player;

means for receiving a plurality of sound effects from the game process, wherein the sound effects are generated in response to game-playing actions of a user of the portable computing device;

means for, for each of the plurality of sound effects, receiving sound effect configuration information indicating chain or loop specifications for the corresponding sound effect;

means for modifying the media received from the media player at least in part in accordance with the sound effect configuration information;

means for determining if there are enough active channels to play the plurality of sound effects and the media simultaneously; and means for, when there are not enough active channels to play the plurality of sound effects and the media simultaneously, mixing selected ones of the plurality of sound effects with the media based on pre-established priorities and based on the sound effect configuration information.

12. The effects and media playback combiner of claim 11, wherein the chain specifications include an indication of an ordering as to how the plurality of sound effects should be played and delay parameters between the playing.

13. The effects and media playback combiner of claim 11, wherein the loop specifications include an indication of a number of times each of the sound effects should be repeated.

14. The effects and media playback combiner of claim 11, wherein the sound effects configuration information is generated programmatically.

15. The effects and media playback combiner of claim 11, wherein the sound effects configuration information is controlled by the game process.

16. A portable media device comprising:

an output device having n channels of output;

an effects and media playback combiner;

a media player controlled by a user to play selected media items according to an order indicated by the user and send the played selected media items to the effects and media playback combiner, a game process configured to generate sound effects in response to game actions undertaken by a user within the game process and to send the generated sound effects with corresponding sound effect configuration information to the effects and media playback combiner; and wherein the effects and media playback combiner is configured to, upon receipt of the generated sound effects and corresponding sound effect configuration information from the game process and the played selected media items from the media player, modify the played selected media items at least in part in accordance with the sound effect configuration information wherein the modified played media items and the sound effects are mixed in a manner that allows the user to hear both the modified played media items and the generated sound effects simultaneously, wherein the mixing includes determining how many of the n channels of output are available and eliminating certain sound effects from being played according to a least recently used standard if there are not enough channels of output available to play all of the generated sound effects and the modified played media simultaneously.

17. The portable media device of claim 16, wherein each of the n channels of input includes processing elements.

18. The portable media device of claim 17, wherein the processing elements include digital rights management.

19. The portable media device of claim 17, wherein the processing elements include time scale modification.

20. The portable media device of claim 17, wherein the processing elements include sample rate conversion.

21. The portable media device of claim 17, wherein the processing elements include equalization.

22. A computer readable medium for storing in non-transitory tangible form computer instructions executable by a processor for intelligently combining sound effects from a game process with media from a media player on a portable computing device, the method performed at an effects and media playback combiner distinct from the game process and the media player, the computer readable medium comprising:

computer code for receiving media from the media player;

computer code for receiving a plurality of sound effects from the game process, wherein the sound effects are generated in response to game-playing actions of a user of the portable computing device;

computer code for, for each of the plurality of sound effects, receiving sound effect configuration information indicating chain or loop specifications for the corresponding sound effect;

computer code for modifying the audio at least in part in accordance with the sound effect configuration information;

computer code for determining if there are enough active channels to play the plurality of sound effects and the media simultaneously; and computer code for, when there are not enough active channels to play the plurality of sound effects and the media simultaneously, mixing selected ones of the plurality of sound effects with the media based on pre-established priorities and based on the sound effect configuration information.

23. The computer readable medium of claim 22, wherein the sound effect configuration information includes a specification of fade duration and final fade level.

24. The computer readable medium of claim 22, further comprising computer code for periodically polling the channels to determine how many are active.

25. The computer readable medium of claim 22, wherein the sound effect configuration information includes left and right pan information.

26. A method for intelligently combining audio effects generated in accordance with a game process with audio from a media player by a portable computing device, the method comprising:

receiving audio from the media player;

receiving a plurality of sound effects from the game process generated in response to game-playing actions of a user of the portable computing device;

receiving sound effect configuration information from the game process for at least one of the plurality of sound effects;

modifying the audio from the media player at least in part in accordance with the sound effect configuration information; and mixing the modified audio and the at least one sound effect having the sound effect configuration information.

27. The method as recited in claim 26, further comprising:

determining if there are enough active audio channels to play the plurality of sound effects and the audio from the media player simultaneously; and when there are not enough active audio channels to play the plurality of sound effects and the audio from the media player simultaneously, mixing selected ones of the plurality of sound effects with the modified audio from the media player based on pre-established priorities and based on the sound effect configuration information.

28. The method of claim 27, wherein the pre-established priorities include a least recently used (LRU) standard.

29. The method of claim 27, further comprising polling each channel at regular intervals to determine which channels are active.

30. The method of claim 26, wherein the sound effect configuration information includes a definition of a corresponding sound effect.

31. The method of claim 26, wherein the mixing includes modifying the volume of the audio to a lower volume than it was originally output while still permitting a user of the portable computing device to hear the audio.

* * * * *